United States Patent [19]
Gautherin

[11] 3,829,794
[45] Aug. 13, 1974

[54] CIRCUIT FOR REDUCING THE DIRECT CURRENT COMPONENT OF AN ALTERNATING CURRENT OUTPUT SIGNAL

[75] Inventor: George A. Gautherin, Woodside, N.Y.

[73] Assignee: Lambda Electronics Corporation, Melville, N.Y.

[22] Filed: Nov. 30, 1972

[21] Appl. No.: 310,788

Related U.S. Application Data

[63] Continuation-in-part of Ser. No. 121,064, March 4, 1971.

[52] U.S. Cl. ................................. 331/113 A, 321/2
[51] Int. Cl. ........................................... H02m 7/52
[58] Field of Search ...................... 331/113.1; 321/2

[56] References Cited
UNITED STATES PATENTS

| | | | |
|---|---|---|---|
| 2,861,237 | 11/1958 | Zelina | 331/113.1 |
| 2,874,293 | 2/1959 | McMurren | 331/113.1 |
| 3,134,948 | 5/1964 | Wilting | 331/113.1 |
| 3,145,348 | 8/1964 | Massey | 331/113.1 |
| 3,146,406 | 8/1964 | Wilting | 331/113.1 |
| 3,161,837 | 12/1964 | Lloyd | 331/113.1 |
| 3,219,906 | 11/1965 | Keller et al. | 331/113.1 |
| 3,219,907 | 11/1965 | Josephson | 331/113.1 |
| 3,308,397 | 3/1967 | Morgan | 331/113.1 |
| 3,373,334 | 3/1968 | Geiz et al. | 331/113.1 |

Primary Examiner—John Kominski
Attorney, Agent, or Firm—Morgan, Finnegan, Durham & Pine

[57] ABSTRACT

A feedback arrangement for removing the net direct current component from the output transformer of an inverter due to an unbalanced volt-time characteristic of the output signal, wherein a direct current signal is used to adjust the respective conduction periods of the inverter switching devices. A portion of the total output signal in the primary of the output transformer is sampled by small resistors and filtered to derive an essentially direct current signal that excites an auxiliary winding magnetically coupled to the core of a saturable input transformer so as to change the core operating point and thereby to alter the switching control signal in a manner tending to reduce the direct current component of the output signal.

16 Claims, 4 Drawing Figures

CIRCUIT FOR REDUCING THE DIRECT CURRENT COMPONENT OF AN ALTERNATING CURRENT OUTPUT SIGNAL

CROSS REFERENCES TO RELATED APPLICATIONS

This application is a continuation-in-part of my co-pending application Ser. No. 121,064, filed Mar. 4, 1971 for "Circuit For Reducing The Direct Current Component Of An Alternating Current Output Signal" and assigned to the assignee of the present invention and application.

BACKGROUND OF THE INVENTION

This invention relates to the use of feedback techniques to remove substantially the direct current component from an alternating current output signal and, specifically, to the reduction of the direct current component of the output signal of electrical inverter circuits and the like.

In electrical inverter and oscillator circuits, which use feedback techniques and operate on an alternating current signal, it is possible to have direct current components in the alternating current output signal. While the presence of such components is not necessarily intolerable, some such circuits contain circuit impedances that are substantial only for alternating current or transient type signals, but that offer relatively little impedance to direct current. Inductive reactances and transformers are examples of impedances of this type which, under ideal operating conditions of the oscillating circuit, are not endangered because of small direct current levels.

In electrical inverters especially, the circuit branches may have a very low direct current impedance. This is true, for example, of both the input and output transformer circuits of transistor-switched inverters and similar circuits. One common inverter of this type uses a balanced, center-tapped output transformer for developing an alternating current output signal that is fed back to a saturable input transformer of which the secondaries drive the base-emitter circuits of the respective transistors. Each half of the output transformer is in series with the collector-emitter path of one of the transistors, which are usually connected in push-pull in the common emitter mode.

If for some reason the output waveform is distorted by reason of transistor conduction imbalances or other circuit nonlinearities, the transistors tend to have a shortened lifetime, and frequently cease to function altogether. Such malfunctions are directly related to a direct current component in the output signal which tends to establish exceedingly large direct currents through the output circuit of the inverter. That is, since the switched transistors usually drive the balanced output transformer directly, the emitter-collector circuit paths through the transistors are coupled directly to a direct current impedance of extremely low value. After a short time of conduction, therefore, it is not uncommon to exceed the maximum permissible dissipation of the transistors, particularly at high power loading.

Direct current levels in the output transformer signal appear in the form of a steady direct current superimposed upon an alternating current waveform, and may arise from an imbalance in the volt-time characteristics of the signal. In other words, a direct current component is present in cyclic waveforms whose energy, for current flowing in a positive direction, is unequal to such energy for current flowing in the opposite direction. Expressed more technically, if the integral of the signal waveform with respect to time for all values of the waveform above a neutral reference value does not equal the integral of the waveform with respect to time for values below the neutral reference value, a volt-time imbalance condition exists and the signal has a direct current component proportional to such imbalance.

The presence of direct currents in circuits of this type has been recognized, but the solutions to its injurious effects have been stop-gap and unsatisfactory. One such stop-gap measure has been the selection of individual switching devices (e.g., transistors and silicon controlled rectifiers) so that the characteristics of each are matched to those of the other. In such cases, the switching devices are triggered into conduction at the same signal levels and, similarly, their conduction characteristics tend to be balanced. Most semiconductor devices are very temperature-sensitive and, even when matched at one temperature, may become mismatched at different temperatures. Furthermore, matching may degrade during the equipment lifetime. Also, if the passive circuit elements are unbalanced, provided the operating conditions of the circuit remain relatively fixed, matching the switching devices alone does not solve the problem, and it may be necessary to attempt to select individual components only after the circuit is constructed and operating. This technique has obvious drawbacks and, manifestly, is ill-suited to mass production.

A second type of compensating technique has been the provision of direct current resistance in the output circuit to limit the DC current. This technique, to be sure, is effective in limiting the current but it is equally effective in wasting power and thus places restrictions on the capacity of the circuit to power larger loads requiring high current delivery, for the resistance limits AC current, as well, and is accompanied by resistive power loss.

The third alternative has been simply to abandon the advantages of this type of inverter in favor of inverters using a single saturable core transfer containing both input (feedback) and output windings. Although such circuits tend to be self-balancing, core losses in the transformer become excessive for circuits of high power output. Thus the single magnetic core circuits are practical only for low power delivery, and accordingly cannot be employed where efficiency is important (as where the circuit is battery-excited) and where substantial loads, such as power supplies and the like, are to be driven. Up to the present invention there appeared to be no satisfactory answer to this problem.

In one known inverter using separate output and input transformers the average current delivered by the direct current source is sensed in order to detect abnormal current conditions. In addition, this circuit includes harmonic detectors, and both the harmonic and overcurrent detectors produce signals which are fed back to the input transformer so as to reduce the base-emitter signal produced at the input transformer below the level required for continued oscillation. As such, the circuit only protects itself against destructive abnormalities but does not correct them. Only when circuit conditions inducing the overload are removed can the inverter again function.

The present invention is distinguished from inverters incorporating such measures as the foregoing in that it compensates automatically for an imbalance producing excessive currents in the output and allows for continued operation even if the cause of the imbalance remains.

SUMMARY OF THE INVENTION

Principal objects of the invention are therefore to provide new approaches to eliminating the direct current signal components from electrical circuits and to overcome the deficiencies of the techniques previously accepted by the art.

Another object is an improved high efficiency inverter circuit accompanied by low DC signal levels.

A further object is the implementation of novel feedback techniques in magnetically coupled circuits.

Yet other objects are an improved oscillator circuit capable of driving high power loads and a voltage doubling inverter circuit which has low DC output signal levels.

In brief, the foregoing objects are realized by detecting the presence of direct current components in the inverter output circuit and developing therefrom a control signal which alters the input signal in a manner tending to reduce the direct current component.

As applied to specific preferred inverter circuits, a portion of the output signal is sampled and averaged to derive a direct current control signal any time a DC component-producing condition is present in the output waveform. This control signal is then used as feedback to a saturable input transformer to adjust the operating point of the transformer such that the driving signal for the transistors (or other switching devices) is altered to compensate for the imbalance. Such feedback is easily accomplished through an auxiliary winding on the saturable core transformer so that the respective duty cycles of the switching devices change in a direction causing the positive and negative volt-time excursions at the output to become balanced.

It has been discovered that the invention is applicable to inverters of the split input voltage type. In these applications, the invention results in not only reduced direct current component but also in a tendency to balance the voltages developed across the split filter capacitors, thus helping to insure that balanced current is drawn from each of the transistors and assuring that the capacitors and transistors encounter voltages only within the designed, rated value.

DESCRIPTION OF THE DRAWINGS

A detailed explanation of the invention as embodied in improved inverter circuits for power supplies is found in the following detailed description and related drawings, wherein.

DESCRIPTION OF THE PREFERRED EMBODIMENT

Figure 1:
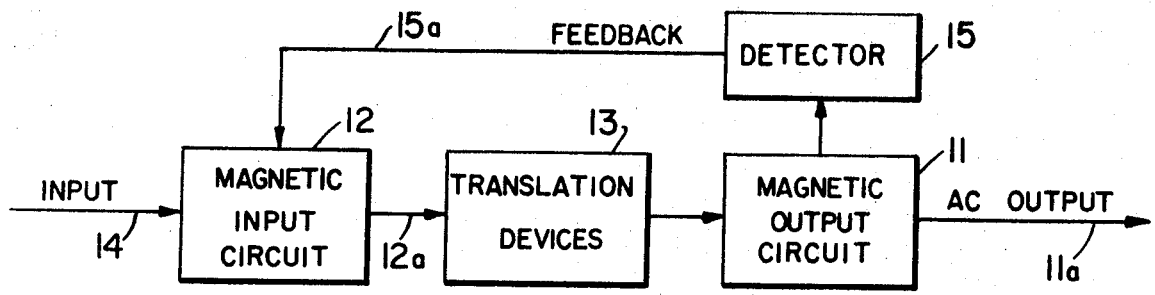
FIG. 1 is a simplified block diagram explaining the fundamental principles of the invention.

Referring to the block diagram of FIG. 1, the general case for the application of the invention is depicted. It is desired to remove the direct current component from the signal in the magnetic output circuit 11 that provides the alternating current output signal. The output circuit 11 is driven by a magnetic input circuit 12, through translation devices 13. These devices might comprise switches, transistors, silicon controlled rectifiers and other such similar devices which translate an input signal into a signal suitable for application to the output circuit. In the case of oscillators and inverters, the input at 14 to the magnetic input circuit comprises a regenerative feedback signal derived directly from the magnetic output circuit 11, and the magnetic input and output circuits will generally constitute transformers, with the input transformer being of the saturable type.

In accordance with the invention, a detector 15 responsive to a net direct current component of the output signal develops a feedback signal that is applied via the conductor 15a to the magnetic input circuit 12. This feedback is of a nature to alter the signal, on the conductor 12a, to the translation devices 13 in a manner tending to establish a balanced condition at the output 11a and thereby remove therefrom any direct current component. In this connection, it should be understood that "balanced" may signify a balance in the volt-time characteristics of the output signal.

Figure 2:
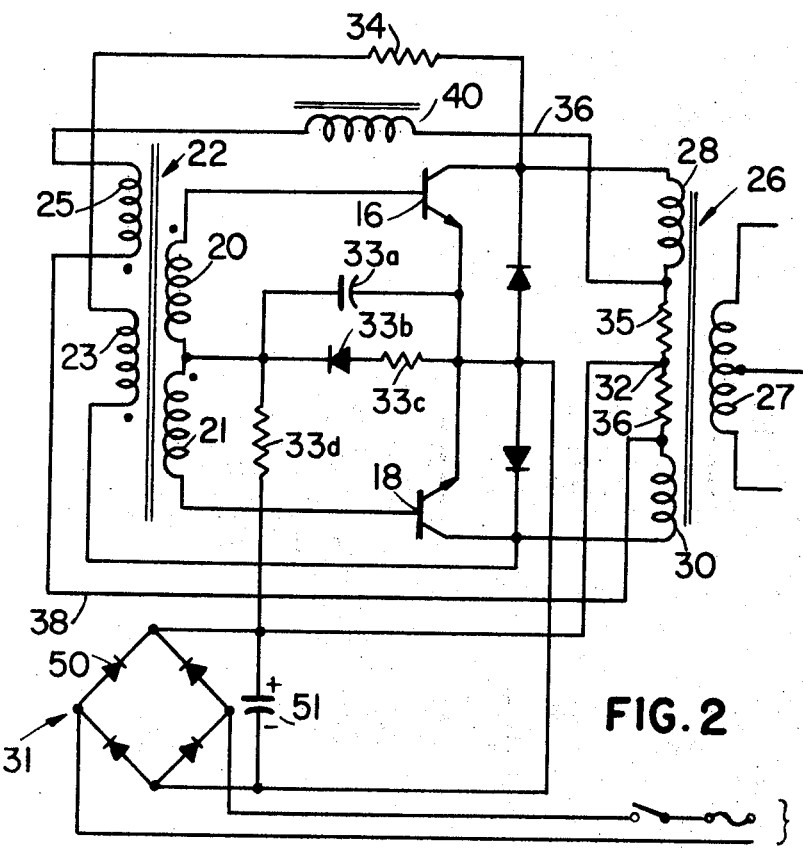
FIG. 2 is a detailed circuit schematic of an improved inverter circuit according to the invention.

The nature of the problem and its avoidance can be better understood with reference to the specific preferred circuits. FIG. 2 represents an uncomplex electronic inverter for converting a direct current input into an alternating current output at higher voltage levels. Inverter circuits of this type are well known to those skilled in the art; however, it is advantageous to review briefly the operation of such circuits for a better appreciation of the invention, which is incorporated in the circuit illustrated.

The inverter comprises a pair of switching transistors 16, 18 whose base-emitter circuits are driven by oppositely poled secondary windings 20, 21 of a saturable core input transformer 22. This type of transformer preferably has a radical decrease of magnetic permeability at given higher flux levels within the core. The core is thus saturable in response to an input signal applied to the primary winding 23 of the transformer. An auxiliary primary winding 25 is also included on the core of the transformer 22, the purpose of which will become apparent at a later point.

As is common in this type of inverter circuit, each of the transistors 16, 18 drives a half-section of the total primary winding of an output transformer 26. Accordingly, the collectoremitter circuit of the transistor 16 is connected in series with the primary winding 28, whereas the other transistor switch 18 has its collector-emitter path connected in series with an identical primary output winding 30. Illustratively, the secondary winding 27 of the output transformer is center-tapped so that it is suitable for driving a rectifier circuit capable of developing substantial current. The circuit of FIG. 2 has been found satisfactory, for example, for the delivery of 1,000 volt-amps to the input rectifier circuit of a regulated direct current power supply.

The switching transistors are operated in the common emitter mode, with the emitters being connected together and to the negative terminal of the direct current source 31. The positive terminal of the source is connected to the neutral point 32 of the output transformer primary circuit. A small forward bias is applied to the base-emitter circuits of the two transistors by the circuit elements 33a and 33d in a well-known manner. Briefly, voltage from the supply 31 is connected via the resistor 33d to the bases of the transistors. This ensures small signal oscillation of the transistors 16, 18 during start-up. The capacitor 33a is charged by the applied voltage and ultimately the charge becomes sufficient to trigger conduction of the transistors at which time the capacitor discharges to provide current starting pulse. The diode 33b in series with the small resistor 33c prevents the starting voltage from reverse biasing the emitters but conducts forwardly to carry the drive current during normal operation.

Under ideal operating conditions, each of the transistors 16, 18 conducts equally and for equal lengths of time. Thus, ideally the excursions of the output waveform in one direction relative to a reference value is identical (but 180° out of phase) with the waveform excursions of the other polarity. It is rare, however, that such a perfectly balanced condition is obtained. It is instead the usual case that variations in the properties of the electronic components will result in current or voltage waveform asymmetry.

During operation, it often occurs that an imbalance in the duration of conduction of the two transistors exists because of differences in their switching characteristics. Accordingly, it is not uncommon that one of the transistors will require a greater potential than the other between the base and emitter electrodes to switch on. By the same token, these transistors may not switch off at the same excitation levels. As a consequence, the output waveform developed across the transformer will have positive and negative excursions (relative, for example, to the potential at the node 32) of different time duration.

If the consequence of the foregoing conditions is to tend to produce a volt-time unbalance in the output circuit (across the transformer primaries, 28, 30), a direct current component will be introduced into the output signal, which is manifested in saturation of the output transformer 26 and a consequent reduction in impedance. The voltage induced in the output transformer primary thus collapses, with more of the DC excitation voltage appearing across the collector-emitter path of the conducting transistor. As can be appreciated from inspection of the inverter circuit, there is very little direct current resistance in the output circuit, consisting only of the collector and emitter resistance of each transistor and the DC resstance of the primary windings. Accordingly, even for very small unbalances in the volt-time characteristics of the signal in each of the primaries 28, 30, a substantial direct current can be introduced in the collector-emitter paths of the transistors. Transistor burn out is usually the result.

In the circuit of FIG. 2, a unique feedback arrangement is implemented to eliminate substantially the direct current component in the output signal caused by the factors just discussed. To this end, small resistances 35, 36 are wired in series with the respective primary output windings to develop a voltage signal proportional to the current flowing through the output windings. The total voltage developed across the two small resistances 35, 36 appears at the leads 37, 38 leading from the resistances to the terminals of the auxiliary, or control, winding 25. Further, a choke 40 in series with the conductor 37 between the resistor 35 and one terminal of the auxiliary winding is effective to smooth the current flow through the series circuit including the resistances 35, 36, the conductors 37, 38, the control winding 25 and the choke 40. Thus the resistances 35 and 36 are effective to sample a portion of the output signal, which is filtered to develop a direct current signal that is directly proportional to any waveform unbalance in the output circuit.

It can be seen that there will be no direct current flow in the series circuit consisting of the above elements if there is no volt-time unbalance in the output circuit of the inverter. This is because the average value of the output signal is zero when balanced, with energy delivered by positive excursions being neutralized by the equal amount of energy in the negative excursions of the sampled signal.

When direct current (representing an unbalance) flows in the control winding 25, a biasing flux is induced into the core of the saturable input transformer 22. This flux changes the quiescent operating point of the core magnetic material and therefore changes the instantaneous value of the flux during the alternating current cycle. Because of this, the transformer core saturates earlier in the cycle for one polarity of flux but later in the cycle for flux of the opposite polarity. For example, if the unbalance is caused by the longer conduction of the transistor 16, the bias flux introduced by the control winding 25 will be of a polarity to cause the core of the transformer to saturate earlier when the feedback signal on the winding 23 excites the input winding 20 with a positive polarity at the base of the transistor 16. Since in that instance the transformer saturates earlier in time, a drive signal of shorter duration is applied to the base-emitter circuit of the transistor 16. Conversely, because the input transformer requires a greater feedback signal for saturation in the opposite polarity, a longer drive signal is applied to the base emitter circuit of the transistor 18.

Figure 3:
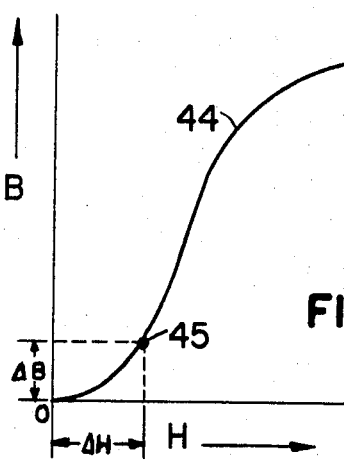
FIG. 3 is a graph showing a typical magnetization curve for an input transformer of the type suitable for use with the invention.

The action of the compensating current through the control winding 25 may be better visualized from FIG. 3, showing one quadrant of a magnetization curve 44 for a typical core material for the input transformer. Flux density B is plotted on this curve along the vertical axis, whereas magnetic intensity H is plotted along the horizontal axis. For simplicity, assume that the input transformer 22 has a quiescent operating point at the vertex 0 of the graph about which the alternating current magnetization takes place. (In practice, the core usually will have a residual magnetization.)

When direct current flows through the control winding 25 to produce a change in excitation $\Delta H$, an incremental change $\Delta B$ takes place in the flux density. The quantity $\Delta B$ represents the magnetization shift induced by the control (error) signal caused by circuit unbalance, and it is this incremental change which affects the volt-time of the feedback signal, applied to the winding 23, required to saturate the transformer. The excitation $\Delta H$ thus operates to place the operating point of the saturable core transformer 22 in a new position, namely at the point 45 on the curve 44 of FIG. 3. Instantaneous flux in the transformer core will equal the algebraic sum of the flux due to the direct current excitation of the control winding 25 and of the flux attributable to the instantaneous value of alternating current excitation of the signal feedback winding 23.

It will be noted that high loop gains can be obtained by using more turns on the auxiliary coils 25 so that, for any DC current flowing through that winding 25, larger increments of excitation are obtained. This will result correspondingly in greater flux increments.

The loop gain $G_L$ for the system of FIG. 2, i.e., the ratio of the direct current $I_{dc}$ flowing in the output circuit without any control feedback to the direct current $I_{dc}'$ flowing with the control feedback is given by the following expressions:

(1)
$$G_L = \frac{I_{dc}}{I_{dc}'} = \frac{2 f(44)\left(\frac{r_s \cdot R_c}{r_s + R_o}\right)(1.25 N_c) A_m N_{op} 10^{-8}}{\left[R_{sat} + \left(\frac{r_s \cdot R_c}{r_s + R_o}\right)\right] R_o T l_m}$$

where the variables in the foregoing equation are defined as follows:

$T$: ½ period, ½ $f$
$f(44)$: A function of the input transformer magnetization curve 44
$N_c$: Winding turns of control winding 25
$A_m$: Cross-sectional area of input transformer magnetic core
$l_m$: Length of input transformer magnetic core
$N_{op}$: Winding turns of the output transformer primary
$r_s$: Total value of sampling resistors 35, 36
$R_{sat}$: Saturation resistance of emitter-collector path of each transistor 16, 18
$R_c$: Resistance of choke 40 and winding turns $N_c$ For a given magnetic material in the saturable input transformer, the gain $G_L$ can be increased by increasing the sampling resistors 35, 36 or by increasing the number of turns $N_c$ on the control winding. Also, the gain can be increased by minimizing the direct current resistance $R_c$ of the feedback control loop.

It is seen that the circuit automatically corrects for volt-time unbalances of the type that have previously placed serious constraints on inverter oscillators. Very positive and tight control over the direct current output component can be achieved and, further, is controllable over a wide range. In that connection, the feedback control loop amplifies the error signal and applies such amplified signal to the circuit input to reduce the undesired output error. The greater such effective amplification, of course, the more perfect is the removal of the direct current component from the output, as at least a minute unbalance drives the feedback winding 25. Importantly, the reduction in component-damaging direct current levels is reduced in a simple yet extremely effective manner, without resort to any of the unsatisfactory alternatives previously available.

Figure 4:
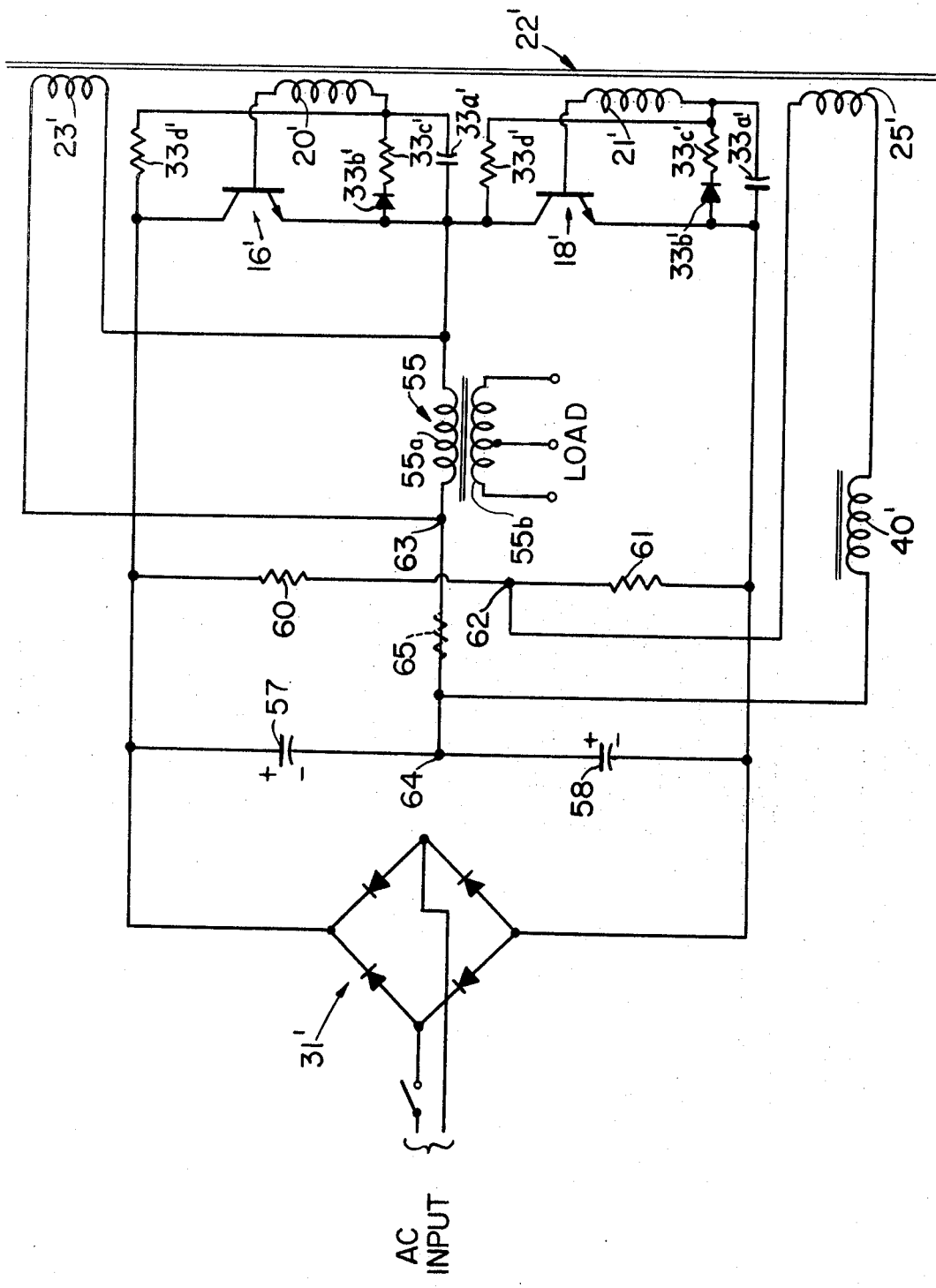
FIG. 4 is a schematic circuit diagram for a voltage-doubling type of inverter incorporating the invention.

FIG. 4 extends the foregoing to a voltage-splitting inverter circuit in which the output transformer 55 is in the center leg between the two transistors 16', 18' (corresponding elements bearing the same reference numerals as before, but primed). As is usual with this type of circuit, the bridge rectifier 31', feeds a pair of serially connected capacitors 57, 58 which produce a net full wave rectified signal which is equal to over 90 percent of the value of the line voltage. As before, the transistors are connected in the common emitter mode, except that the emitter of the transistor 16' is connected to the collector of the transistor 18'. Here the output signal is developed across the transformer primary 55a and coupled to the load through the secondary 55b.

As before, a feedback winding 23' is connected to return the output signal to the input transformer 22'. In this case the control winding 25' is connected to the center leg of the circuit in a bridge so that it responds to the net d.c. component of current in the output circuit. For this purpose a pair of voltage dividing resistors 60, 61 equal in value establishes a desired reference potential at the node 62. The voltage impressed across the control winding 25' is therefore equal to the difference of the potentials at the nodes 62 and 64. In theory, these voltages will be equal if there is no d.c. unbalance.

An alternate connection is shown by the dashed line indicating the resistor 65 joining the nodes 63 and 64. This resistor functions to sample the output current excursions and replaces the resistors 60 and 62 when used. Although the alternate connection performs satisfactorily, the embodiment shown is the preferred circuit because larger loop gain can be obtained with the bridge configuration.

In the FIG. 4 circuit, it can be seen that d.c. unbalances tend to establish different average potentials between the nodes 62 and 64 and these are used to develop a control signal impressed across the winding 25' after filtering the choke 40'. If the circuit of FIG. 4 has a d.c. unbalance, different voltages will be established across the two capacitors 57, 58. The greater the net d.c. component, the greater the difference in potentials across the capacitors since more current (average) is being conducted by one than the other. The present invention also solves the capacitor unbalance by equalizing the average current through each.

Although the invention has been described with reference to particular preferred embodiments, certain modifications and variations, both in form and detail, will occur to those skilled in the art. As an example, the direct current-reducing feedback may be introduced in a manner other than by an auxiliary winding on the saturable input transformer, and the invention is not limited to any particular kind of switching device between the input and output circuits. Accordingly, all such modifications and variations are intended to be included within the scope and spirit of the claims.

What is claimed is:

1. In an electrical inverter circuit having an outut transformer including a primary winding, an input transformer excited by an output signal appearing at the output transformer to provide a drive signal, and switching means for connecting the output transformer to a direct current source in response to the drive signal:

means responsive to the net direct current component of the output signal in the primary winding of the output transformer, resulting from a volt-time unbalance of said output signal, for developing a control signal; and means for applying the control signal to the input transformer to vary the drive signal so as to regulate the conduction of the switching means in a manner reducing the direct current component of the output signal.

2. The electrical inverter circuit of claim 1, wherein:

the control signal is a direct current signal; output the applying means comprises a winding on the input transformer operative to bias the input transformer.

3. The electrical inverter circuit of claim 2, wherein:

the input transformer has a core of magnetic material that is saturable in response to the exciting output signal; and
the bias varies the values of the respective flux excursions, due to the exciting signal, required to saturate the core with flux.

4. The electrical inverter circuit of claim 1, wherein:

the output transformer includes first and second primary windings:
the switching means is connected to provide a pair of alternately conducting series loops including the respective windings and each loop including the direct current source; and
the responsive means includes a resistive element in series with each primary winding for sampling a portion of the output signal developed at the primary windings.

5. The electrical inverter circuit of claim 4, wherein:

the responsive means further includes means for averaging the signal portion sampled by the resistive elements.

6. The electrical inverter circuit of claim 5, wherein:

the averaging means comprises an electrical inductance; and
the applying means comprises a control winding on the input transformer connected to receive the averaged signal from inductance.

7. An electronic oscillator circuit of the type including an output transformer, an input transformer excited by the output signal at the output transformer, and a pair of alternately conducting switching devices driven by the input transformer to connect a direct current source to the output transformer, the improvement comprising:

a control winding associated with the input transformer to generate a bias flux therein in response to a control signal applied thereto; and
means responsive to the output signal for developing a control signal for application to the control winding, said control signal representing the net direct current component of the output signal due to an unbalance in the volt-time characteristic thereof.

8. The electronic oscillator of claim 7, wherein:

the control signal developing means includes means for sampling at least a portion of the output signal and means for averaging such sampled portion.

9. The electronic oscillator circuit of claim 8, wherein:

the sampling means includes at least one resistive element connected in series with the output transformer; and
the control signal developing means includes means for connecting the resistive element in a current loop including the control winding, and an inductive element in such series loop for averaging the current therethrough.

10. The electronic oscillator circuit of claim 9, wherein:

the transformer includes first and second primary windings connected in a respective current loop with one of the switching devices; and
a resistive sampling element is connected in series with each of the primary windings.

11. The electronic oscillator of claim 10, wherein:

each resistive element is connected in a series loop with the control winding.

12. The electronic oscillator circuit of claim 8, wherein:

the input transformer has a magnetic core that is saturable and a pair of secondary windings each connected to a respective switching device to apply a drive signal to each thereof; and
the control signal varies the operating point of the saturable core whereby the duty cycle of each drive signal is varied in response to variations in the control signal.

13. The oscillator circuit of claim 7, wherein the output transformer is connected in a series path with each of the switching devices, the circuit further comprising:

a direct current source including rectifier means having output terminals connected to at least two capacitors connected in series and having a center common terminal connected to one side of the output transformer.

14. The oscillator circuit of claim 13, further comprising:

means for establishing a reference potential; and
means for connecting the control winding so as to respond to the potential difference between the reference potential and the potential at the common terminal.

15. The oscillator circuit of claim 13, further comprising:

an impedance connected in series with the output transformer for developing a signal related to the net direct current component therein, the control winding being connected to respond to such signal.

16. The oscillator circuit of claim 14, further comprising:

first and second impedances providing a voltage dividing network connected across the direct current source and having an intermediate circuit point providing the reference potential, one side of the control winding being connected to such point and the other side of the control winding being coupled to the capacitor common terminal in a bridge circuit.

* * * * *